United States Patent [19]

Kunze et al.

[11] Patent Number: 5,475,547
[45] Date of Patent: Dec. 12, 1995

[54] FLYWHEEL FOR A MAGNETIC-TAPE-CASSETTE APPARATUS

[75] Inventors: Norbert Kunze, Ehringshausen; Dieter Müller, Staufenberg, both of Germany

[73] Assignee: U.S. Philips Corporation, New York, N.Y.

[21] Appl. No.: 268,690

[22] Filed: Jun. 29, 1994

[30] Foreign Application Priority Data

Jul. 8, 1993 [DE] Germany ............... 43 22 751.1
Jan. 7, 1994 [DE] Germany ............... 9400154 U

[51] Int. Cl.$^6$ ............................................. G11B 5/008
[52] U.S. Cl. ............................ 360/96.1; 360/137
[58] Field of Search ............... 360/96.1, 97.1, 360/96.3, 137; 74/572, 445

[56] References Cited

U.S. PATENT DOCUMENTS 1,750,278  3/1930  Moyer ........................ 74/445
4,630,498  12/1986 Santi ........................... 74/445
4,943,878  7/1990  Lin ........................ 360/96.3 X

FOREIGN PATENT DOCUMENTS 2611846  9/1988  France .................. F16F 15/30

*Primary Examiner*—John H. Wolff
*Attorney, Agent, or Firm*—Brian J. Wieghaus

[57] ABSTRACT

A flywheel in a magnetic tape apparatus includes preferably identical, flat discs (3a, 3b) which are joined to one another and each have a bevelled portion (11a, 11b) at their circumferences (9a, 9b). The bevelled portions (11a, 11b) define a circumferential groove (17) for a belt (19) and the two discs (3a, 3b) are joined to one another in mirror-inverted relationship.

16 Claims, 1 Drawing Sheet

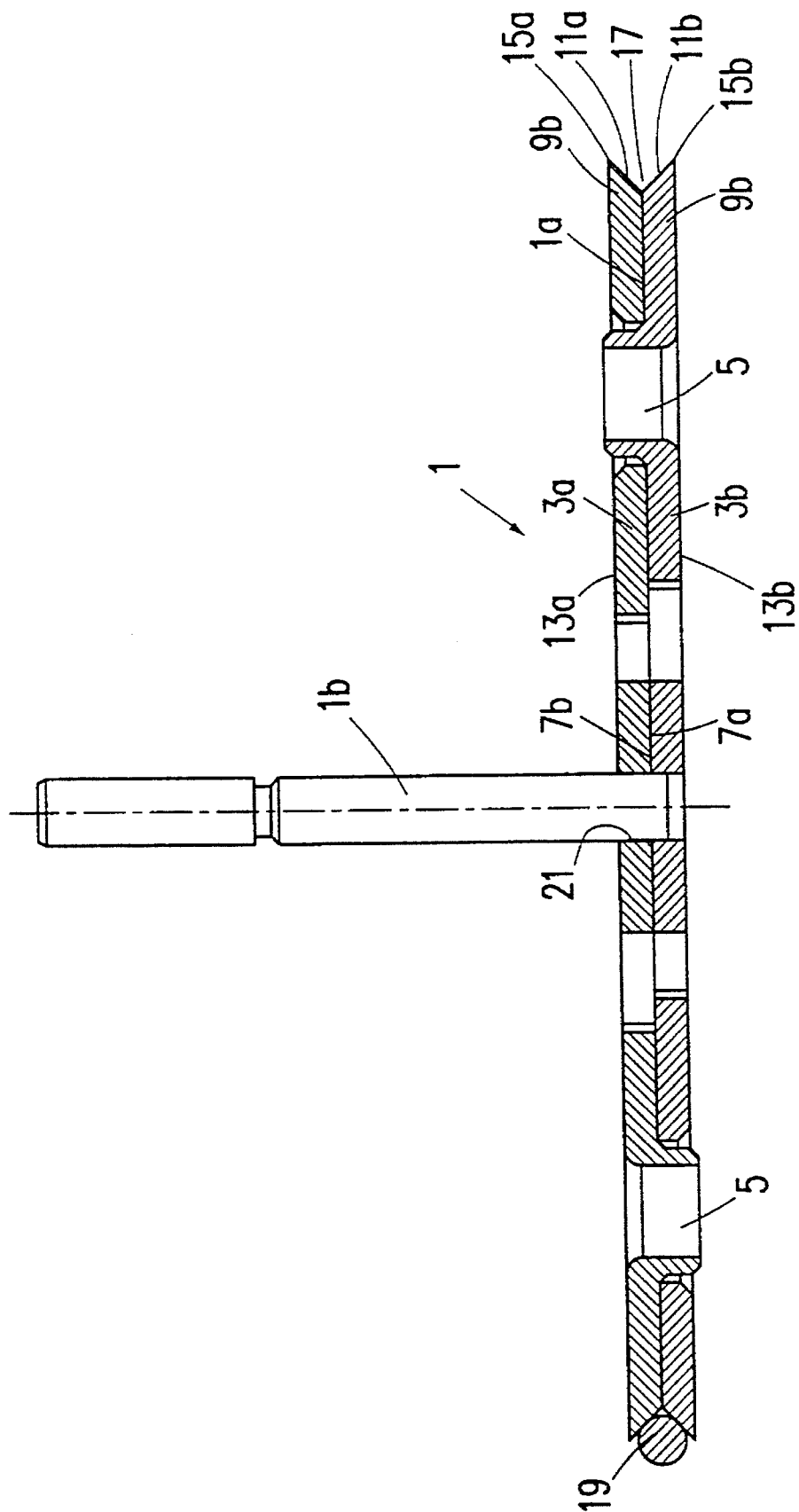

FLYWHEEL FOR A MAGNETIC-TAPE-CASSETTE APPARATUS

BACKGROUND OF THE INVENTION

The invention relates to a magnetic-tape-cassette apparatus with a tapedeck for reproducing magnetic tape cassettes, comprising and more particularly to an improvement in a flywheel, in such a deck.

Flywheels used in the decks of magnetic-tape-cassette apparatuses typically include a groove in their circumferential edge, in which groove a belt for driving the flywheel is engageable, and a flywheel shaft. Such a flywheel is shown in U.S. Ser. No. 08/113,547, filing date Aug. 27, 1993 herewith incorporated by reference). The flywheel shaft generally also forms the capstan which moves the magnetic tape from the supply reel to the take-up reel past the magnetic head at a given speed.

It is known to manufacture such flywheels as machined parts made of brass. Such a flywheel is very expensive as regards production and material.

It is also known to provide such flywheels with a circumferential plastic moulding having an external groove for the belt. Such a flywheel can be manufactured economically but poses problems because the moulding may become cracked and come loose due to ageing of the plastic moulding and due to the different expansion coefficients. The groove for the belt may then also disappear and the deck is no longer operational.

It is further known to mould a flywheel with its belt groove entirely from a plastic material and to secure a metal disc with a parallel face to the plastic flywheel in order to increase the flywheel mass. This results in an increased thickness of the flywheel.

SUMMARY OF THE INVENTION

It is an object of the invention to provide a magnetic-tape cassette apparatus with a flywheel having an adequate flywheel mass and a small thickness which can be manufactured economically but remains fully operational throughout the life of the tape deck.

According to the invention this object is achieved in that the flywheel consists of preferably identical, flat discs which are joined to one another and each have a bevelled portion at their circumferences, the circumferential groove for the belt being formed by the bevelled portions of two discs which are joined to one another in mirror-inverted relationship.

Such a flywheel can be manufactured very economically as a punched part. The groove for the belt is integral and cannot come off the flywheel due to ageing. The flywheel mass and the thickness are comparable to those of a machined flywheel owing to the use of, for example, steel for the flywheel discs.

In a further embodiment of the invention the discs are welded, riveted or glued to one another. In general, it is possible to use any type of disc connection which remains intact throughout the life of the flywheel.

In a further embodiment of the invention the shaft, which is used as a capstan, is mounted in the flywheel center by pressing, gluing or riveting.

The invention will now be described in more detail with reference to the drawing.

BRIEF DESCRIPTION OF THE DRAWING

The drawing is a sectional view of a flywheel 1 for the deck of a magnetic-tape-cassette apparatus.

DESCRIPTION OF THE PREFERRED EMBODIMENTS

In the FIGURE, flywheel 1 includes a flywheel pulley 1a and a capstan 1b. The flywheel pulley 1a is made up of two discs 3a and 3b of, for example, steel sheet. As is shown in the drawing, the two discs are joined by rivets 5 which are integrated in the pulley discs. Riveting is only one of the possible connection methods. It is likewise possible to glue or weld the pulley discs 3a and 3b to one another.

Both pulley discs have bevelled portions , or faces, 11a, 11b at their circumferences 9a, 9b and are joined to one another by their radial faces 7a and 7b. They are preferably mirror-inverted. The bevelled portions 11a, 11b begin at the faces 7a and 7b and in the assembled condition they diverge from one another towards the pulley edges 15a and 15b at the outer faces 13a and 13b. The bevelled portions 11a and 11b are inclined in such a way that, in the assembled condition of the flywheel, they form the circumferential groove 17 for the belt 19 as shown in the drawing.

I claim:

1. A flywheel for a magnetic tape apparatus, said flywheel comprising:

first and second disc each having a radial face and a circumferential bevelled edge, said disc being joined to each other at said radial faces with said bevelled circumferential edges diverging away from each other and defining an outer circumferential groove for receiving a drive belt of the tape apparatus.

2. A flywheel for a magnetic tape apparatus as recited in claim 1, wherein said first and second discs are identical to each other and joined in a mirror-inverted manner.

3. A flywheel for a magnetic tape apparatus as claimed in claim 2, characterized in that the discs are made of steel sheet.

4. A flywheel for a magnetic tape apparatus as claimed in claim 1, characterized in that the discs are made of steel sheet.

5. A flywheel for a magnetic tape as claimed in claim 4, characterized in that the discs are one of welded, riveted and glued to one another.

6. A flywheel for a magnetic tape apparatus as claimed in claim 5, wherein a said disc has a center, and further comprising a capstan shaft mounted in said disc center by one of pressing, gluing and riveting.

7. A magnetic tape apparatus as claimed in claim 4, characterized in that a said disc has a center, and further comprising a capstan shaft mounted in the center of said disc by one of pressing, gluing and riveting.

8. A magnetic tape apparatus as claimed in claim 1, characterized in that the discs are one of welded, riveted and glued to one another.

9. A magnetic tape apparatus as claimed in claim 8, characterized in that a said disc has a center, and further comprising a capstan shaft mounted in the center of said disc by one of pressing, gluing and riveting.

10. A magnetic tape apparatus as claimed in claim 1, characterized in that a said disc has a center, and further comprising a capstan shaft mounted in the center of said disc by one of pressing, gluing and riveting.

11. A flywheel for a magnetic tape apparatus, said flywheel consisting of:

first and second discs each having a radial face and a circumferential bevelled edge, said discs being joined to each other at said radial faces with said bevelled circumferential edges diverging away from each other and defining an outer circumferential groove for receiving a drive belt of the tape apparatus, one of said discs having a center, and a capstan shaft fixed at the center of said one disc.

12. A flywheel for a magnetic tape apparatus as recited in claim 11, wherein said first and second discs are identical to each other and joined in a mirror-inverted manner.

13. A flywheel for a magnetic tape apparatus as claimed in claim 12, characterized in that the discs are made of steel sheet.

14. A flywheel for a magnetic tape apparatus as claimed in claim 11, characterized in that the discs are made of steel sheet.

15. A flywheel for a magnetic tape as claimed in claim 11, characterized in that the discs are one of welded, riveted and glued to one another.

16. A flywheel for a magnetic tape apparatus as recited in claim 11, wherein said capstan shaft is fixed to said disc by one of pressing, gluing and riveting.

* * * * *